US008253527B2

(12) United States Patent  
Yang et al.

(10) Patent No.: US 8,253,527 B2
(45) Date of Patent: Aug. 28, 2012

(54) ALARM SYSTEM AND METHOD FOR WARNING OF EMERGENCIES

(75) Inventors: Tse Yang, Taipei Hsien (TW); Pi-Jye Tsaur, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 244 days.

(21) Appl. No.: 12/696,015

(22) Filed: Jan. 28, 2010

(65) Prior Publication Data

US 2011/0095862 A1  Apr. 28, 2011

(30) Foreign Application Priority Data

Oct. 23, 2009  (CN) .......................... 2009 1 0308750

(51) Int. Cl.
G09B 21/00 (2006.01)
G10L 13/00 (2006.01)
G10L 21/06 (2006.01)
G10L 21/00 (2006.01)

(52) U.S. Cl. ......... 340/4.1; 704/258; 704/269; 704/271; 704/274

(58) Field of Classification Search .............. 340/4.1; 704/258–269, 271, 274
See application file for complete search history.

(56) References Cited

U.S. PATENT DOCUMENTS

| 4,870,402 | A | * | 9/1989 | DeLuca et al. ............... 340/7.51 |
| 5,473,705 | A | * | 12/1995 | Abe et al. ...................... 382/100 |
| 5,890,120 | A | * | 3/1999 | Haskell et al. ................. 704/271 |
| 5,982,853 | A | * | 11/1999 | Liebermann .................... 379/52 |
| 6,687,612 | B2 | * | 2/2004 | Cherveny ...................... 701/461 |
| 6,819,782 | B1 | * | 11/2004 | Imagawa et al. ................ 382/115 |
| 7,671,732 | B1 | * | 3/2010 | Sennett et al. ............ 340/539.11 |
| 7,676,372 | B1 | * | 3/2010 | Oba ................................ 704/271 |
| 7,680,298 | B2 | * | 3/2010 | Roberts et al. ................. 382/100 |
| 7,774,194 | B2 | * | 8/2010 | Liebermann et al. ............ 704/7 |
| 8,005,263 | B2 | * | 8/2011 | Fujimura et al. ............... 382/103 |
| 2005/0129185 | A1 | * | 6/2005 | McClelland et al. ........... 379/52 |
| 2006/0013440 | A1 | * | 1/2006 | Cohen et al. ................... 382/103 |
| 2006/0026001 | A1 | * | 2/2006 | Bravin et al. ................ 704/270.1 |
| 2006/0234193 | A1 | * | 10/2006 | Sahashi ......................... 434/112 |
| 2007/0064888 | A1 | * | 3/2007 | Nola et al. ................... 379/93.15 |
| 2007/0096895 | A1 | * | 5/2007 | Sneade ........................... 340/506 |
| 2008/0144781 | A1 | * | 6/2008 | Liebermann et al. ........... 379/52 |
| 2008/0195394 | A1 | * | 8/2008 | Francioli ........................ 704/271 |
| 2008/0243513 | A1 | * | 10/2008 | Bucchieri et al. .............. 704/270 |
| 2009/0158364 | A1 | * | 6/2009 | Swamidas ...................... 725/105 |
| 2010/0048159 | A1 | * | 2/2010 | Stenquist .................... 455/404.1 |

* cited by examiner

*Primary Examiner* — Daniel Wu
*Assistant Examiner* — Emily C. Terrell
(74) *Attorney, Agent, or Firm* — Altis Law Group, Inc.

(57) ABSTRACT

An alarm system and method for warning of emergencies are provided. The method predefines a sign language list, and stores the sign language list in a storage device of a terminal device connected to at least one video camera. The method can control the video camera to capture sign images of a person when the person warns of an emergency using sign language, and combine the sign images to create a combined image. In addition, the method analyzes each of the sign images of the combined image to generate a group of sign numbers according to the sign language list stored in the storage device, generates a sign event according to the group of sign numbers, and responds to the sign event using a corresponding alarm.

19 Claims, 5 Drawing Sheets

| Number | 0 | 1 | 2 | 3 | 4 |
|---|---|---|---|---|---|
| Sign language |  |  |  |  |  |
| Number | 5 | 6 | 7 | 8 | 9 |
| Sign language |  |  |  |  |  |

# ALARM SYSTEM AND METHOD FOR WARNING OF EMERGENCIES

BACKGROUND

1. Technical Field

Embodiments of the present disclosure relate generally to sign recognition in electronic equipments, and more particularly to an alarm system and a method for warning of emergencies using sign language.

2. Description of Related Art

While communication technologies have developed at a fast pace, particularly for the audio technology, little attention has been paid to technology related to visual communication other than by video means.

Around the world, gestures such as sign language, play an integral part of communication within every culture. The sign language may be used by traffic police, street vendors, motorists, lecturers, a symphony conductor, and a restaurant waiter. However, it is inconvenient and difficult to warn a person (e.g. a deaf person) of an emergency situation because that person cannot hear sounds of the emergency situation. Accordingly, there is a need for an alarm system and method for warning of an emergency based on sign language, to overcome the above-mentioned problems.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
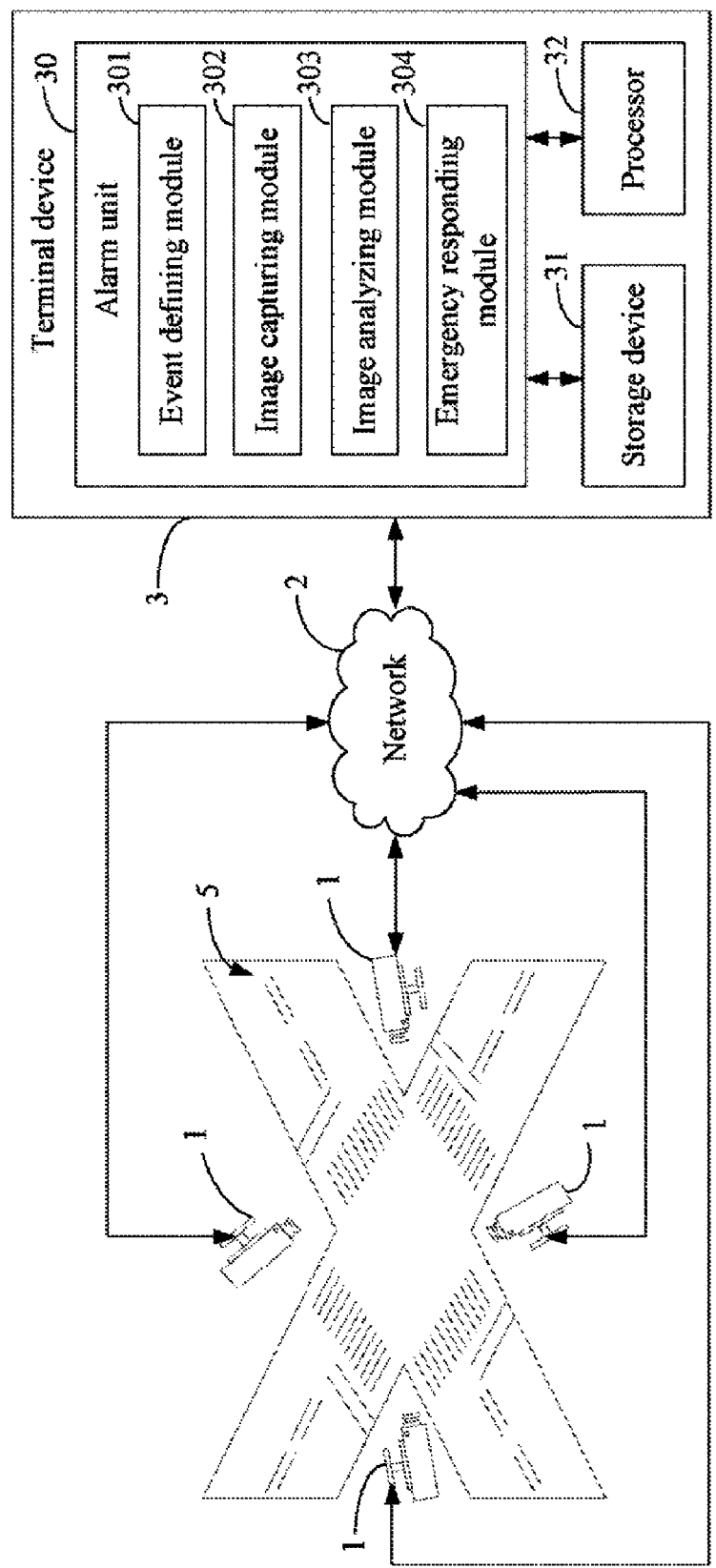
FIG. 1 is a schematic diagram of one embodiment of an alarm system using sign language.

FIG. 1 is a schematic diagram of one embodiment of an alarm system based on sign language. In one embodiment, the alarm system may include at least one video camera 1, and a terminal device 3. The at least one video camera 1 may be placed in a road, a room, a supermarket, a bank, for example. The video camera 1 may be an IP camera, a digital camera, for example. In the embodiment, each video camera 1 is located at an intersection of a road 5, and connects to a terminal device 3 through a network 2, such as an Internet, an intranet, or any other suitable communication network. The terminal device 3 may be a mobile phone, a desktop, a laptop, a handheld, or any other suitable communication device.

With respect to FIG. 1, four video cameras 1 are located at the intersection of the road 5, and are used to capture a plurality of sign images of a person in sequence, when the person warns of an emergency on the road 5 using sign language. The video camera 1 transmits the plurality of sign images to the terminal device 3 through the network 2. The terminal device 3 analyzes each of the signed images to generate a sign event, and responds to the sign event using a corresponding alarm. In one embodiment, the sign event may consist of a group of numbers, for example, "110" represents a public security alarm, "119" represents a fire alarm, and "120" represents an emergency alarm. The alarm may be sent by phone call, message or e-mail.

The terminal device 3 includes an alarm unit 30, a storage device 31, and at least one processor 32. In one embodiment, the alarm unit 30 is included in the storage device 31 or a computer readable medium of the terminal device 3. In another embodiment, the alarm unit 30 may be included in an operating system of the terminal device 3, such as the Unix, Linux, Windows 95, 98, NT, 2000, XP, Vista, Mac OS X, an embedded operating system, or any other compatible operating system. The storage device 31 may be an internal storage device, such as a random access memory (RAM) for temporary storage of information and/or a read only memory (ROM) for permanent storage of information. The storage device 31 may also be an external storage device, such as a hard disk, a storage card, or a data storage medium. The processor 31 runs various software modules stored in the storage device 31 to perform various functions for the terminal device 3.

In one embodiment, the alarm unit 30 may include an event defining module 301, an image capturing module 302, an image analyzing module 303, and an emergency responding module 304. One or more computerized codes of the function modules 301-304 may be stored in the storage device 31 and executed by the processor 32. In general, the word "module," as used herein, refers to logic embodied in hardware or firmware, or to a collection of software instructions, written in a programming language. The software instructions in the modules may be embedded in firmware, such as an EPROM. The modules described herein may be implemented as either software and/or hardware modules and may be stored in any type of computer-readable medium or other storage device.

Figure 2:
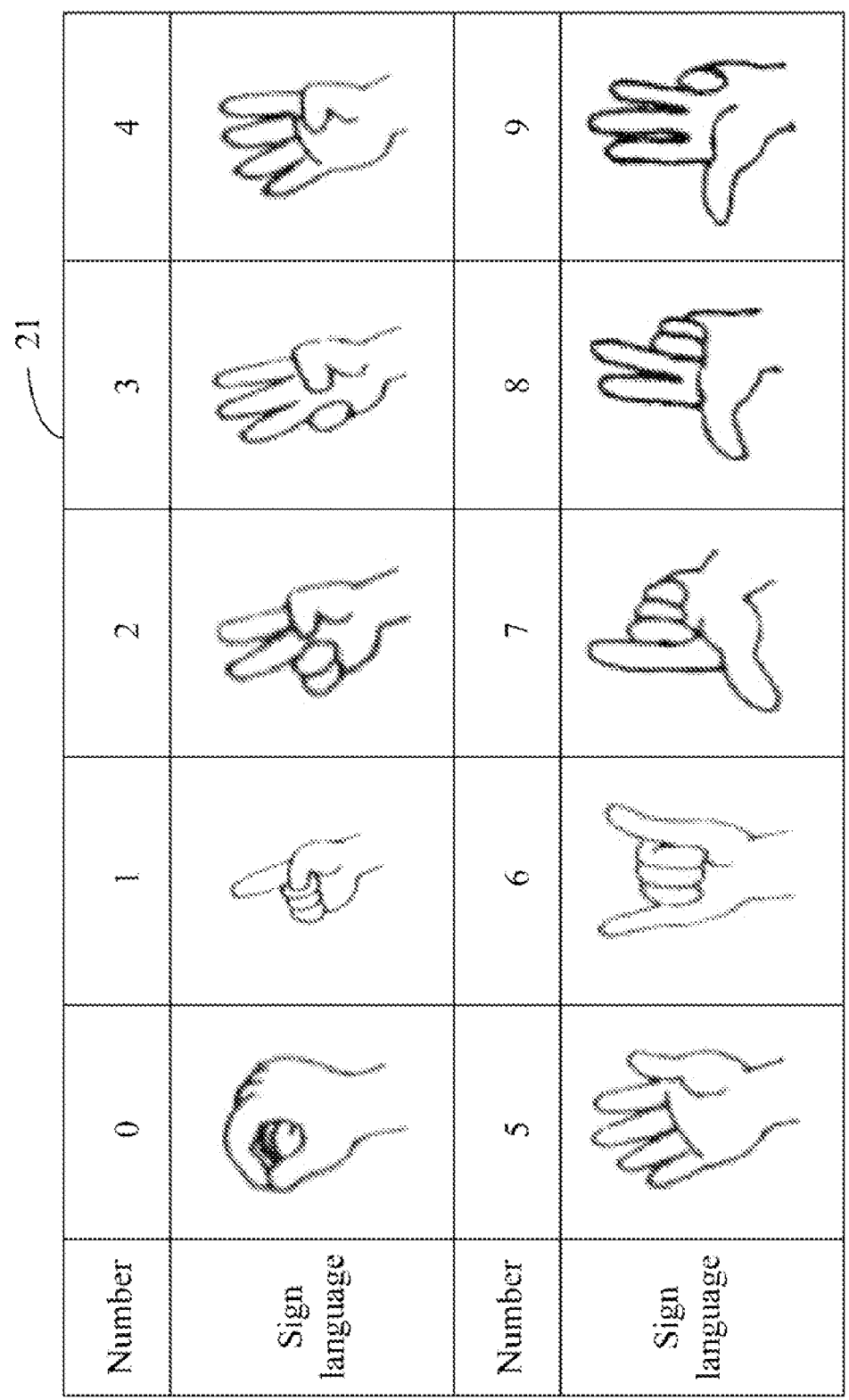
FIG. 2 is a schematic diagram illustrating a common sign language list stored in a storage device of a terminal device of FIG. 1.
Figure 3:
FIG. 3 is a schematic diagram illustrating a deaf sign language list stored in a storage device of a terminal device of FIG. 1.
Figure 3:
Figure 3:
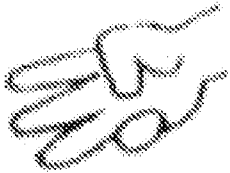
Figure 3:
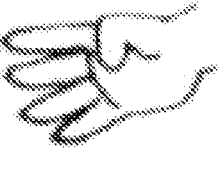
Figure 3:
Figure 3:
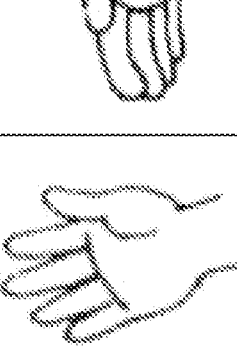
Figure 3:
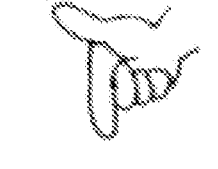
Figure 3:
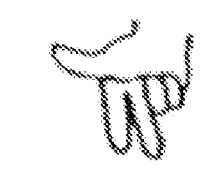
Figure 3:
Figure 3:
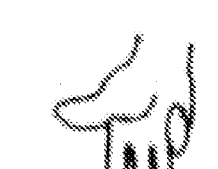

The event defining module 301 is operable to predefine a sign language list, and store the sign language list in the storage device 31. In one embodiment, the sign language list may be a common sign language list 21 as shown in FIG. 2, or a deaf sign language list 22 as shown in FIG. 3. The common sign language list 21 records a plurality of common signs that are familiar to a common person, and each of the common signs corresponds to a number of numerical "0-9." The deaf sign language list 22 records a plurality of deaf signs that are familiar to a deaf person, and each of the deaf signs corresponds to a number of numerical "0-9." In other embodiment, the sign language can be defined as a body language according to user's requirements. For example, a "120 emergency alarm" can be defined as clasping his/her head with hands, and a "119 fire alarm" can be defined as bending his/her waist.

Figure 4:
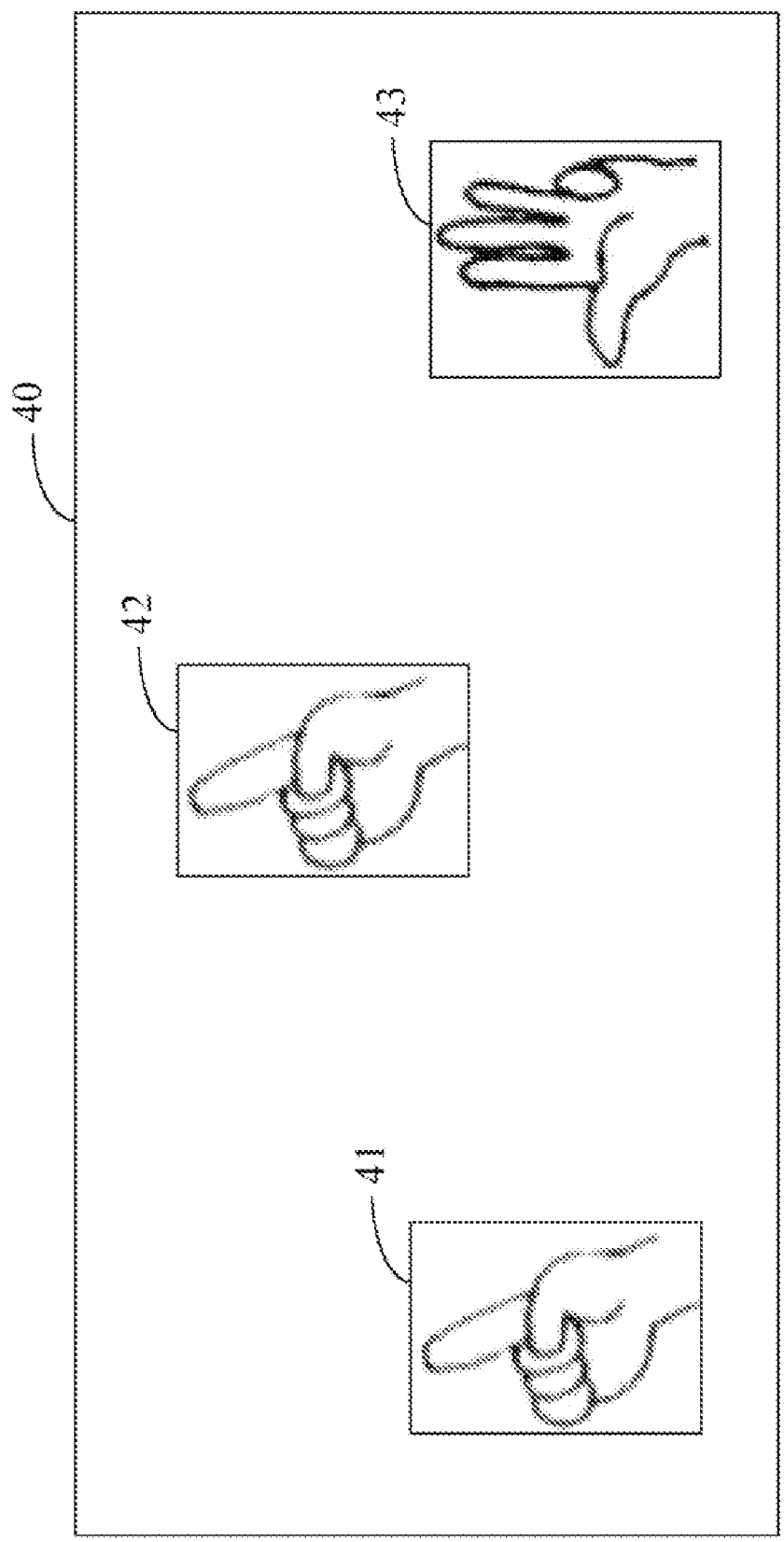
FIG. 4 is a schematic diagram illustrating an example of sign images captured by a video camera of the alarm system of FIG. 1.

The image capturing module 302 is operable to control the at least one video camera 1 to capture a plurality of sign images of a person in sequence when the person warns of an emergency using sign language, and combine the sign images to create a combined image. The image capturing module 302 is further operable to determine whether the video camera 1 is off, and turn on the video camera 1. Referring to FIG. 4, in one instance, it is assumed that the emergency is a "119 fire alarm," the video camera 1 captures three sign images 41-43 of the person, and creates the combined image 40 by combining the three sign images 41-43. The first sign image 41 represents a first number "1", the second sign image 42 represents a second number "1", and the third sign image 43 represents the third number "9".

The image analyzing module 303 is operable to analyze each of the signed images of the combined image to generate a sign number according to the sign language list stored in the storage device 21. In the example with respect to FIG. 4, the image analyzing module 303 analyzes the first signed image 41 to the first number "1", analyzes the second signed image 42 to a second number "1", and the third signed image 43 represents a third number "9", if the sign language list is from the common sign language list 21. Then the image analyzing module 303 combines the three numbers "1", "1", and "9" in sequence to generate a group of sign numbers "119".

The emergency responding module 304 is operable to generate a sign event according to the group of sign numbers and determines whether the sign event is an emergency, and respond to the sign event using a corresponding alarm. In one embodiment, the alarm may be sent by means of phone, message or e-mail. For example, if the image analyzing module 303 generates the sign number "119" by analyzing each of the sign images 41-43, the emergency responding module 304 generates an alarm message and sends the alarm message to a fire station.

Figure 5:
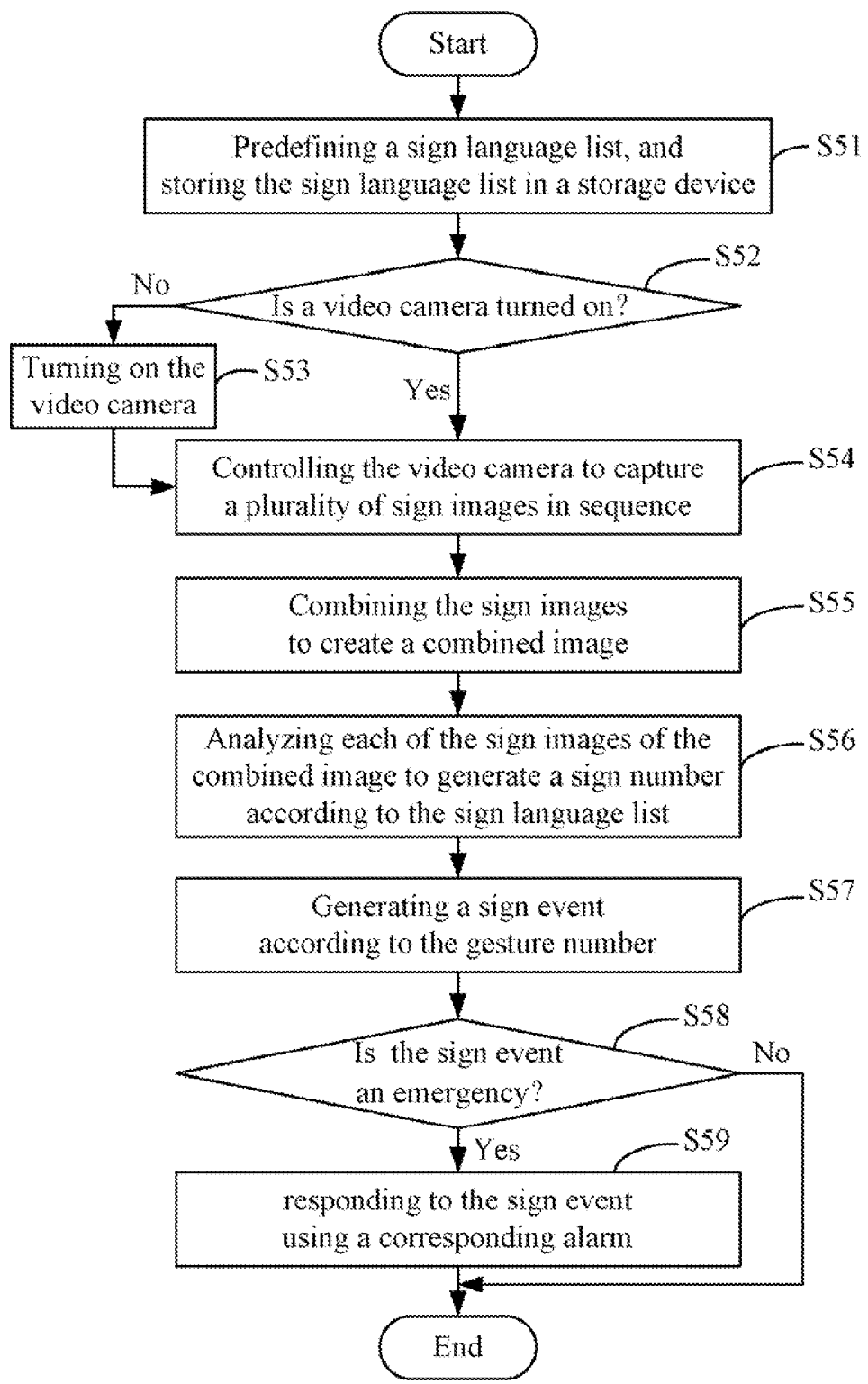
FIG. 5 is a flowchart of one embodiment of a method for warning of emergencies by using the alarm system of FIG. 1.

FIG. 5 is a flowchart of one embodiment of a method for warning of emergencies by the alarm system as described in FIG. 1.

In block S51, the event defining module 301 predefines a sign language list, and stores the sign language list (i.e., the common sign language list 21 as shown in FIG. 2, or the deaf sign language list 22 as shown in FIG. 3) in the storage device 31 of the terminal device 3.

In block S52, the image capturing module 302 determines whether the video camera 1 is off when a person alarms an emergency. If the video camera 1 is off, in block S53, the image capturing module 302 turns on the video camera 1. Otherwise, if the video camera 1 is turned on, in block S54, the image capturing module 302 controls the video camera 1 to capture a plurality of sign images of the person in sequence.

In block S55, the image capturing module 302 combines the sign images to create a combined image. In one example with respect to FIG. 4, it is assumed that the emergency is a "119 fire", the video camera 1 captures three sign images 41-43 of the person, and creates the combined image 40 by combining the three sign images 41-43. The first sign image 41 represents a first number "1", the second sign image 42 represents a second number "1", and the third sign image 43 represents the third number "9".

In block S56, the image analyzing module 303 analyzes each of the sign images of the combined image to generate a sign number according to the sign language list stored in the storage device 21. In one example with respect to FIG. 4, the image analyzing module 303 analyzes the first sign image 41 to the first number "1", analyzes the second sign image 42 to a second number "1", and the third sign image 43 represents a third number "9",if the sign language list is the common sign language list 21. Then the image analyzing module 303 combines the three numbers "1", "1", and "9" in sequence to generate a sign number "119".

In block S57, the emergency responding module 304 generates a sign event according to the sign number. In block S58, the emergency responding module 304 determines whether the sign event is an emergency. In block S59, the emergency responding module 304 responds to the sign event using a corresponding alarm if the sign event is an emergency. Otherwise, the flow ends. In one embodiment, the alarm may be sent by means of phone, message or e-mail. For example, if the image analyzing module 303 generates the sign number "119" by analyzing each of the sign images 41-43, the emergency responding module 304 generates an alarm message and sends the alarm message to a fire station.

All of the processes described above may be embodied in, and fully automated via, functional code modules executed by one or more general purpose processors of a computing device. The functional code modules may be stored in any type of readable medium or other storage devices. Some or all of the methods may alternatively be embodied in specialized computing devices.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An alarm system, comprising:
    a storage device; and
    a terminal device connected to at least one video camera, the terminal device comprising:
    an event defining module operable to predefine a sign language list that stores different signs languages, and store the sign language list into the storage device, wherein each of the sign languages corresponds to a numerical number;
    an image capturing module operable to control the least one video camera to capture a plurality of sign images of a person when the person warns of an emergency using a sign language, and combine the sign images to create a combined image;
    an image analyzing module operable to analyze each of the sign images of the combined image to generate a group of sign numbers according to the sign language list stored in the storage device; and
    an emergency responding module operable to generate a sign event according to the group of sign numbers, and respond to the sign event using a corresponding alarm.

2. The alarm system according to claim 1, wherein the image capturing module is further operable to determine whether the at least one video camera is off, and turn on the video camera when the video camera is off 3. The alarm system according to claim 1, wherein the emergency responding module is further operable to determine whether the sign event is an emergency.

4. The alarm system according to claim 1, wherein the sign language list is a common sign language list recording a plurality of common signs that are familiar to a common person.

5. The alarm system according to claim 1, wherein the sign language list is a deaf sign language list recording a plurality of deaf signs that are familiar to a deaf person.

6. The alarm system according to claim 1, wherein the sign language is defined as a body language according to user's requirements.

7. The alarm system according to claim 1, wherein the alarm is sent by means of phone call, message or e-mail.

8. A method for warning of an emergency, the method comprising:
    predefining a sign language list that stores different signs languages, and storing the sign language list into a storage device of a terminal device connected to at least one video camera, wherein each of the sign languages corresponds to a numerical number;
    controlling the at least one video camera to capture a plurality of sign images of a person when the person warns of an emergency accident using a sign language;

combining the plurality of sign images to create a combined image;

analyzing each of the sign images of the combined image to generate a group of sign numbers according to the sign language list stored in the storage device;

generating a sign event according to the group of sign numbers;

determining whether the sign event is an emergency; and responding to the sign event using a corresponding alarm if the sign event is an emergency.

9. The method according to claim 8, further comprising:

determining whether the at least one video camera is off; and turning on the at least one video camera when the at least one video camera is off.

10. The method according to claim 8, wherein the sign language list is a common sign language list for recording a plurality of common signs that are familiar to a common person.

11. The method according to claim 8, wherein the sign language list is a deaf sign language list for recording a plurality of deaf signs that are familiar to a deaf person.

12. The method according to claim 8, wherein the sign language is defined as a body language according to user's requirements.

13. The method according to claim 8, wherein the alarm is sent by means of phone call, message or e-mail.

14. A storage medium having stored thereon instructions that, when executed by a processor of a computing device, cause the computing device to perform a method for warning of an emergency, the method comprising:

predefining a sign language list that stores different signs languages, and storing the sign language list into a storage device of a terminal device connected to at least one video camera, wherein each of the sign languages corresponds to a numerical number;

controlling the at least one video camera to capture a plurality of sign images of a person when the person warns of an emergency using a sign language;

combining the plurality of sign images to create a combined image;

analyzing each of the sign images of the combined image to generate a group of sign numbers according to the sign language list stored in the storage device;

generating a sign event according to the group of sign numbers;

responding to the sign event using a corresponding alarm.

15. The storage medium according to claim 14, wherein the method further comprises:

determining whether the at least one video camera is off; and turning on the at least one video camera when the at least one video camera is off.

16. The storage medium according to claim 14, wherein the sign language list is a common sign language list for recording a plurality of common signs that are familiar to a common person.

17. The storage medium according to claim 14, wherein the sign language list is a deaf sign language list for recording a plurality of deaf signs that are familiar to a deaf person.

18. The storage medium according to claim 14, wherein the sign language is defined as a body language according to user's requirements.

19. The storage medium according to claim 14, wherein the alarm is sent by means of phone call, message or e-mail.

\* \* \* \* \*